US007957510B2

(12) United States Patent
Denney et al.

(10) Patent No.: US 7,957,510 B2
(45) Date of Patent: Jun. 7, 2011

(54) NOTIFYING NETWORK CONTACTS OF INQUIRIES

(75) Inventors: Justin S. Denney, Seattle, WA (US);
Nils H. Pohlmann, Seattle, WA (US);
Edward D. Harris, Bellevue, WA (US);
Jason C. Fluegel, Seattle, WA (US);
Stephen P. Rosato, Woodinville, WA (US); Michael L. Torres, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 11/626,207

(22) Filed: Jan. 23, 2007

(65) Prior Publication Data

US 2008/0177875 A1  Jul. 24, 2008

(51) Int. Cl.
*H04M 1/64* (2006.01)
*G06F 15/173* (2006.01)

(52) U.S. Cl. ...... 379/88.12; 455/3.01; 705/80; 709/204; 709/224; 715/781

(58) Field of Classification Search ............... 379/88.12; 434/350; 709/206, 213, 224, 204; 715/781; 455/3.01; 705/80
See application file for complete search history.

(56) References Cited

U.S. PATENT DOCUMENTS

| 5,923,846 | A  | * | 7/1999  | Gage et al. ............. 709/213 |
| 6,711,378 | B2 | * | 3/2004  | Kashima ................. 434/350 |
| 6,807,566 | B1 | * | 10/2004 | Bates et al. ............. 709/206 |
| 6,816,578 | B1 |   | 11/2004 | Kredo |
| 6,993,555 | B2 |   | 1/2006  | Kay |
| 7,058,682 | B2 | * | 6/2006  | McGee et al. ............. 709/204 |
| 7,092,939 | B2 | * | 8/2006  | Koll ........................... 1/1 |
| 7,299,222 | B1 | * | 11/2007 | Hogan et al. ................. 1/1 |
| 7,813,986 | B2 | * | 10/2010 | Gardner et al. ........... 705/36 R |
| 2001/0051982 | A1 |  | 12/2001 | Graziani |
| 2003/0054886 | A1 |  | 3/2003  | Lion |
| 2004/0019637 | A1 |  | 1/2004  | Goodman |
| 2004/0205175 | A1 |  | 10/2004 | Kammerer |
| 2006/0080432 | A1 |  | 4/2006  | Spataro |
| 2006/0142880 | A1 |  | 6/2006  | Deen |
| 2006/0240851 | A1 |  | 10/2006 | Washburn |
| 2008/0153413 | A1 | * | 6/2008  | Li et al. ................. 455/3.01 |
| 2008/0319916 | A1 | * | 12/2008 | Hoag et al. .................. 705/80 |

FOREIGN PATENT DOCUMENTS

DE    WO0246981 A1    6/2002

OTHER PUBLICATIONS

Nardi, Bonnie, Whittaker, Steve, and Bradner, Erin, "Interaction and Outeraction: Instant Messaging in Action, " AT&T Labs-Research, Menlo Park, CA, and University of Calif at Irvine, Dec. 2000, pp. 79-88.

* cited by examiner

*Primary Examiner* — Gerald Gauthier
(74) *Attorney, Agent, or Firm* — Shook, Hardy & Bacon LLP

(57) ABSTRACT

A method, computer-readable medium, and user interface for displaying an inquiry indication related to an inquiring user's inquiry are described. An inquiring user prepares and submits an inquiry in an inquiry application. Upon preparing and submitting an inquiry, a notice of the inquiry is generated and routed to the inquiring user's network contacts. An inquiry indication is generated to notify network contacts that an inquiry has been submitted by the inquiring user. A network contact may select the inquiry indication to display an inquiry feature and may select an inquiry feature to view the inquiry and respond to the inquiry.

19 Claims, 7 Drawing Sheets

NOTIFYING NETWORK CONTACTS OF INQUIRIES

BACKGROUND

The Internet provides a vast amount of resources that may be searched to find information pertaining to specific issues or questions. However, even though a vast amount of information is available on the Internet, the specific information desired may not exist or may be difficult to locate. As the Internet develops, several applications have evolved that allow Internet users to find information that is difficult to locate or is not available on the Internet. For example, when a user cannot find the information on the Internet by performing a simple search, users may prepare and post specific questions or comments for which other Internet users may respond utilizing inquiry applications such as Windows Live™ QnA. The responses may provide the posting user, among others, with the desired information.

Unfortunately, responding users may not sufficiently respond to specific questions or comments, thereby leaving a posting user without the desired information. In one instance, users do not respond to a specific question or comment posted by another user. In another instance, responding users may share limited similar characteristics, interests, or perspectives with the posting user and, accordingly, post a non-useful response. Therefore, while existing inquiry applications allow users to prepare and post specific questions, the inquiring user may still not receive the information he desires.

Network contacts, such as friends, family, and co-workers, are more likely to provide an adequate response to a specific question or comment than non-network contacts. For example, a person who is a network contact of a posting user is more likely to provide a response and share similar characteristics, interests, or perspectives with the posting user. However, existing web applications do not provide the ability for a posting user to share a publicly posted question or comment with the posting user's network contacts.

Accordingly, for a network contact to respond to a friend's question or comment in existing web applications, it might be difficult to locate the specific question or comment. A posting user may manually e-mail a link for each question to network contacts; however, independently communicating with network contacts is not efficient, and the e-mail may be disregarded by network contacts as SPAM-type e-mail.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described below are directed to displaying an inquiry indication related to a user's inquiry. An inquiring user prepares and submits an inquiry, such as a question, in an inquiry application, such as an Internet question and answer application. Upon preparing and submitting the inquiry, a notice of the inquiry is automatically generated and routed to one or more network contacts of the inquiring user.

An inquiry indication, such as an icon in a contact list, notifies a network contact that an inquiry has been submitted by the inquiring user. Once the inquiry indication is displayed, a network contact may select the inquiry indication to display an inquiry feature, such as the question title. A network contact may then select an inquiry feature, such as the question title, having an embedded link to the inquiry in an inquiry application.

BRIEF DESCRIPTION OF THE SEVERAL VIEWS OF THE DRAWINGS

Embodiments are described in detail below with reference to the attached drawing figures.

DETAILED DESCRIPTION

The subject matter described herein is presented with specificity to meet statutory requirements. However, the claimed subject matter is not limited to the specific embodiments described herein. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide techniques for notifying at least a portion of an inquiring user's one or more network contacts. In general, embodiments described herein relate to methods, computer-readable media, and graphical user interfaces for inquiry indication.

Accordingly, in one embodiment, the present invention relates to methods for inquiry indication. A method may include receiving notice of an inquiry; displaying at least one inquiry indication; receiving a request to display at least one inquiry feature; displaying at least one inquiry feature; receiving a request to display an inquiry; and displaying an inquiry.

In another embodiment, the present invention relates to computer-readable media having computer-executable instructions embodied thereon for performing the methods described herein.

In yet another embodiment, the present invention is directed to graphical user interfaces for inquiry indication. The graphical user interfaces for inquiry indication may include an inquiry interface; an inquiry preferences interface; a network contact interface such as a web application interface or an instant message application interface; an inquiry feature interface; and inquiry response interface.

Having briefly described an overview of embodiments of the present invention, an exemplary operating environment suitable for use in implementing embodiments of the present invention is described below.

Figure 1:
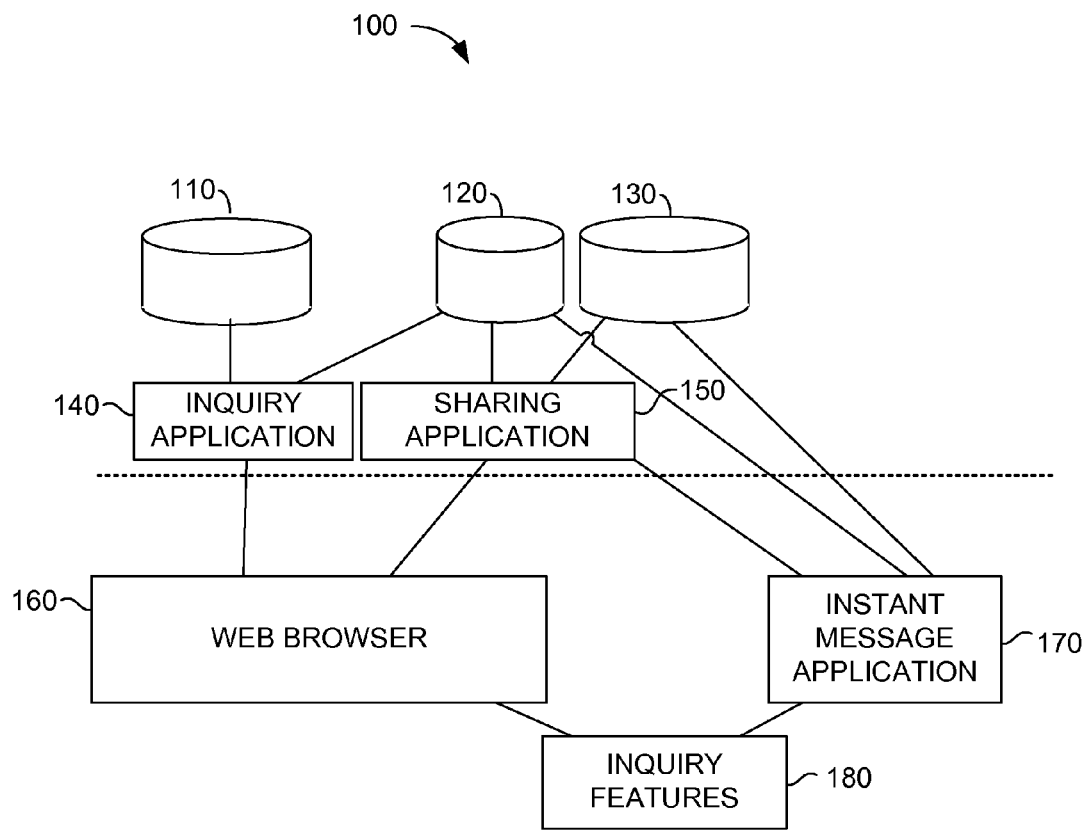
FIG. 1 illustrates an exemplary system for dynamically providing inquiry indications over a network to one or more network contacts, according to an embodiment.

FIG. 1 illustrates an exemplary system for dynamically providing inquiry indications over a network to one or more network contacts. An inquiry may be a single question or comment or a series of questions or comments posted by a user.

As shown in FIG. 1, an exemplary system includes an inquiry application 140 and a sharing application 150. Inquiry application 140 is an application that allows users, such as inquiring users, to prepare and post an inquiry and allows other users, such as other Internet users, to respond to the inquiry. The other Internet users may include network contacts of the user posting the inquiry. Network contacts are users that are listed in an inquiring user's contact list. Network contacts may include an inquiring user's friends, family, co-workers, etc. In one embodiment, inquiry application 140 may include a web application that resides on a server that is configured to support interoperable machine-to machine communication between client-computing devices. Exemplary inquiry applications may include applications having a public posting forum, such as Windows Live™ QnA, Yahoo!® Answers, Askville™ by Amazon®, etc. The inquiry application 140 may include an application programming interface ("API") configurable to access a database. Examples of such APIs include, without limitation, active data objects ("ADO"), remote data objects ("RDO"), and the like.

Sharing Application 150 is an application that resides on a server and enables communication over a network including, for example, blogging, picture sharing, and contact listing. Exemplary sharing applications include Windows Live™ Spaces, Yahoo! 360™, and myspace.com®.

Storage mechanism 110 stores data pertaining to inquiry application 140, such as questions, answers, comments, etc. Storage mechanism 120 stores contact information, such as telephones, emails, and addresses of users that may be utilized with inquiry application 140, sharing application 150, and instant message application 170. The instant message application 170 allows a user to communicate with other users in real-time and displays the conversation of all participating users on one screen. The instant message application 170 may be a stand-alone application that resides on a client machine. Exemplary instant message applications include Windows Live™ Messenger, AIM®, and Google Talk™. Storage mechanism 130 stores profiles and pictures to be utilized by the sharing application 150. Profile information may include user interests and pictures. Although storage mechanisms 110, 120, and 130 are depicted as being three separate databases, it will be appreciated that storage mechanisms 110, 120, and 130 may be integrated into any number of data stores including one data store.

An inquiring user prepares and submits an inquiry to an inquiry application. In one embodiment, an inquiring user utilizes a web browser 160, such as Internet Explorer, on a client computing device to access an inquiry application 140, such as Windows Live™ QnA, Yahoo!® Answers, Askville™ by Amazon®, etc.

Web browser 160 and instant message application 170 reside on client computing devices and either may be utilized for displaying an inquiry indication. Accordingly, a network contact may be a web browser 160 user, an instant message application 170 user, or a combination thereof. A web browser 160 user utilizes a web browser to access inquiry application 140 or sharing application 150. For example, a web browser 160 user may open Internet Explorer browser, type in the URL address of an inquiry application 140 and/or sharing application 150 to view an inquiry indication. However, in most instances, an instant message application residing on the client computer is utilized for displaying an inquiry indication.

An inquiry indication is displayed to notify the network contact of the inquiry or comment. An inquiry indication is displayed in the contact list provided in an e-mail service (not shown), web browser 160, or instant message application 170. The inquiry indication may be an indication icon, an inquiring user name format, an inquiry subject, an inquiry title, a link to the user inquiry, a sound, a format technique, or a combination thereof. In one embodiment, the inquiry indication may be positioned adjacent to the inquiring user's name in the contact list. In another embodiment, the inquiry indication may be positioned near the inquiring user's name in the contact list. In yet another embodiment, the inquiry indication may simply be positioned in the contact list. Alternatively, the inquiry indication may notify the network contact of the inquiry or comment by displaying the indication in a feed of contact updates. For example, in a sharing application 150, a network contact may view a listing of updates pertaining to sharing application 150 contacts, such as the inquiring user. The updates may include, for example, a recently posted inquiry or comment, an updated profile, an added photograph, an added blog entry, etc. The inquiry indication may be positioned near the inquiring user's name in the listing of updates.

As previously mentioned, in one embodiment a network contact may view the inquiry indication displayed within a contact list. For example, a network contact may utilize a web browser 160, which accesses inquiry application 140 or sharing application 150, to view their contact list and, thereby, view the inquiry indication. Alternatively, a network contact may utilize an instant message application 170 and may, upon login, view the contact list automatically.

FIG. 1 illustrates a system for displaying an inquiry indication to an inquiring user's network contacts. Prior to submitting an inquiry to the inquiry application 140, an inquiring user may request to display an inquiry indication notifying the inquiring user's network contacts that the inquiring user has posted an inquiry. In one embodiment, the request to display the inquiry indication to the inquiring user's network contacts may be automatic upon submission of the inquiry. In another embodiment, the inquiring user may designate all network contacts to receive the inquiry indication. In another embodiment, the inquiring user may designate a select number of network contacts or specific network contacts to view the inquiry indication. In yet another embodiment, the inquiring user may designate a specific category of network contacts, such as family, friends, co-workers, etc., to receive the inquiry indication. To designate network contacts, the inquiring user may select a check box, or use a similar feature, to select the portion of network contacts intended to view the inquiry indication. Alternatively, network contacts that may view the inquiry indication may be limited to the network contacts that have access to the inquiring user's sharing application.

By way of illustration, a first client-computing device is an inquiring user's computer, second and third client-computing devices are computers being utilized by network contacts, and a fourth client-computing device is a computer belonging to an individual that is not an inquiring user's network contact. Accordingly, if the inquiring user on the first client-computing device designates all network contacts to view the inquiry indication, the inquiry indication is only displayed by the second and third client-computing devices being utilized by network contacts. Alternatively, the inquiring user on the first client-computing device may choose to notify only the network contact using the second client-computing device. Thus, an inquiry indication is only displayed by the second client-computing device.

If the inquiring user designates, either automatically or manually, at least a portion of the one or more network contacts to view the inquiry indication and the inquiry is submitted to inquiry application 140, the inquiry is posted on the corresponding website, and the inquiring user's name, time when the inquiry was posted, and the location of the really simple syndication (RSS) feed for the inquiry content is stored in storage mechanism 120. Essentially, inquiry application 140 updates a time stamp in storage mechanism 120 to indicate a new inquiry for the particular inquiring user.

To display the inquiry indication, the web browser accessing the inquiry application 140 or sharing application 150, or the instant message application 170 compares its time stamps with the time stamps in storage mechanism 120 for each network contact. In one embodiment, the inquiry application 140, sharing application 150, or instant message application 170 time stamps are stored time values associated with each instance a network contact logs in to the respective application. The comparison of time stamps may occur at the time the network contact logs in utilizing the web browser or instant messaging application or periodically during the time the network contact is logged in utilizing the web browser or instant message application.

If storage mechanism 120 has an updated time stamp indicating new content, the inquiry indication is displayed. Accordingly, in addition to storing contact information, storage mechanism 120 also stores the software that implements the APIs used to display the inquiry indication. In one embodiment, the software that implements APIs used to display the inquiry indication may be stored in another storage mechanism. The APIs used to display the inquiry indication may employ numerous methods for displaying the inquiry indication. For example, in one embodiment, an inquiry indication may be displayed for each new inquiry posted by an inquiring user since the last network contact login or within a particular time span (e.g., within 24 hours). In another embodiment, a single inquiry indication may be displayed for multiple inquiries posted by an inquiring user since the last network contact login or within a particular time span (e.g., within one week). In yet another embodiment, multiple inquiry indications or a single inquiry indication may be displayed for multiple or single inquiries posted by multiple inquiring users since the last network contact login or within a particular time span (e.g., within one month).

Upon receiving an inquiry indication, an inquiry feature may be displayed. FIG. 1 illustrates a system for displaying at least one inquiry feature in a network user's contact list. A network contact may select the inquiry indication displayed in the contact list to view at least one inquiry feature 180. An inquiry feature 180 may include an inquiry subject, an inquiry title, an inquiry detail(s), a link to the inquiry application having the user inquiry, or a combination thereof. An inquiry subject may be a general topic or category of the inquiry. An inquiry title may be the title of the question or the question itself. Inquiry details may be the detailed question posted or specific details regarding the question. A URL link to the inquiry application posting the user inquiry allows the network contact to view the posted inquiry.

In one embodiment, the inquiry features may include features of inquiries previously posted by the inquiring user. Alternatively, the inquiry features may include features of inquiries posted by an inquiring user within a particular time period (e.g., within 24 hours). In yet another embodiment, the inquiry features may include inquiry features of inquiries posted since the time the network contact last logged in. The inquiry features to be displayed to a network contact may be determined by the network contact user, the inquiry application provider, the sharing application provider, the instant message application provider, the inquiring user, or a combination thereof.

In an embodiment where a network contact selects an inquiry indication displayed in a contact list, a request to sharing application 150 is issued. Sharing application 150 then transmits the request to storage mechanism 120 and accesses the location of the inquiry content for a particular inquiring user. Sharing application 150 uses the location of the inquiry content to retrieve inquiry features, such as an inquiry title, an inquiry detail, a link to the user inquiry, or a combination thereof. Sharing application 150 retrieves the inquiry features by reading the RSS feed for a particular inquiring user and, subsequently, the web browser 160 or instant message application 170 accesses the inquiry features from sharing application 150. In one embodiment, sharing application 150 is not used; inquiry application 140 or an alternative application performs functions similar to those performed by sharing application 150.

If an inquiry feature displayed is a link or embedded link to the inquiry, once the link is selected, the network contact is linked, via a URL, to the inquiry application 140 and inquiry is displayed to the network contact user. In one embodiment, inquiry features 180 are not used and the network user may be automatically linked to the inquiry application 140 to view the inquiry upon selection of the inquiry indication. In another embodiment, upon selection of the inquiry indication, the inquiry may be displayed in the form of an inquiry feature and the network contact may not be linked to the inquiry application 140; thus, the network contact may respond to the inquiry via a method alternative to the inquiry application 140, such as instant messaging, blogging, or e-mailing.

Figure 2:
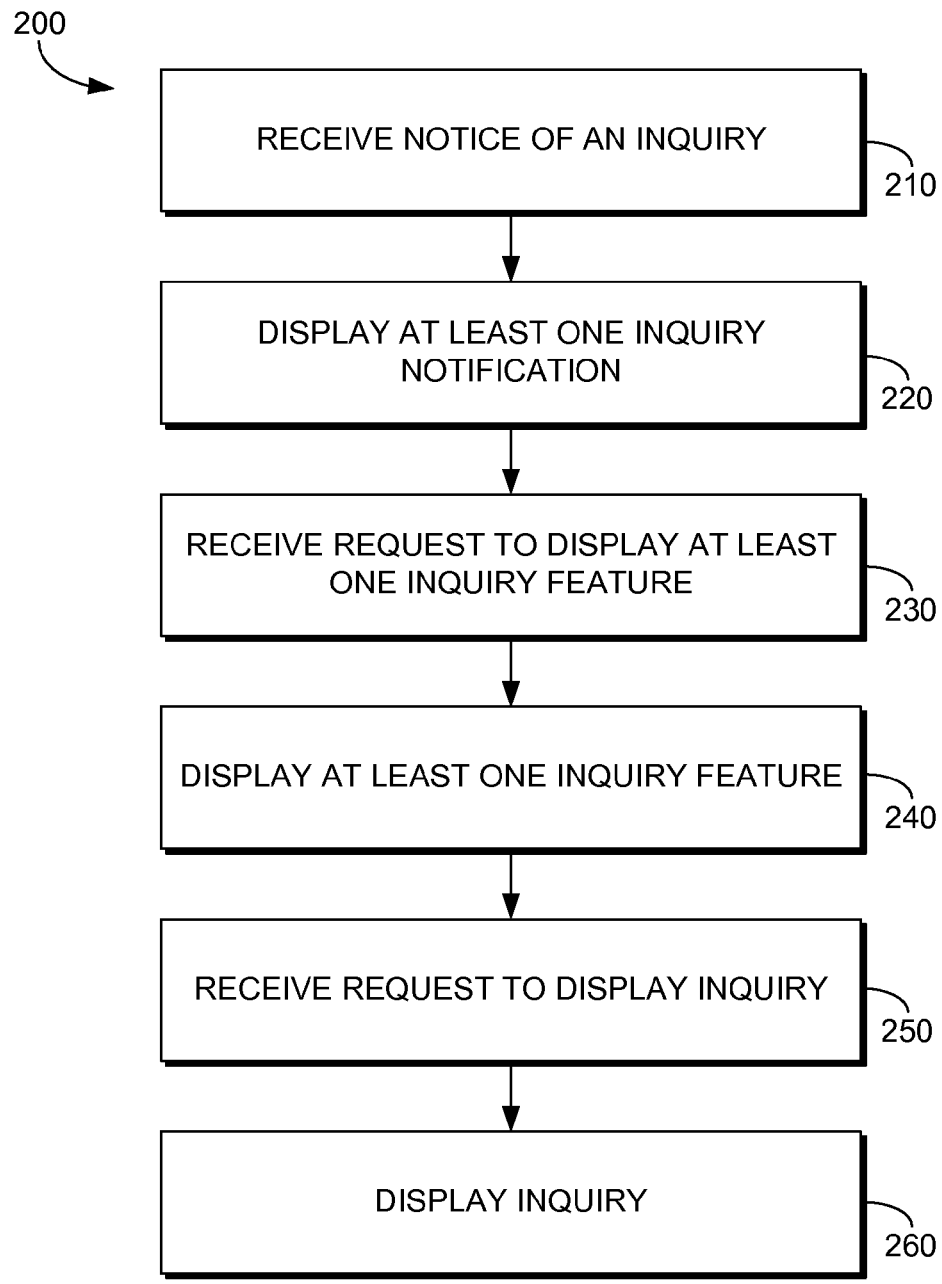
FIG. 2 is a flow diagram illustrating a method for inquiry indication, according to an embodiment.

With reference to FIG. 2, a flow diagram is illustrated showing a method 200 for notifying an inquiring user's network contacts of an inquiry in accordance with an embodiment of the present invention. Method 200 is but one example of a suitable method; the invention is not limited to this example.

Initially, at block 210, notice of an inquiry is received. The inquiry originates from an inquiring user preparing an inquiry and requesting transmission the inquiry to at least a portion of the one or more network contacts of the inquiring user. In one embodiment, the inquiring user may designate specific network contacts to receive notice of an inquiry or may designate all network contacts to receive notice of an inquiry. In another embodiment, the inquiring user may designate a group of network contacts to receive notice of an inquiry, such as friends, family, or co-workers. In still another embodiment, the notice of an inquiry is automatically transmitted to network contacts.

Upon receiving notice of an inquiry, at least one inquiry indication is displayed to the one or more designated network contacts of the inquiring user at block 220. An inquiry indication serves to notify a network contact that an inquiring user has submitted an inquiry. In one embodiment, the inquiry indication is displayed in the contact list of the network contact. The contact list may be accessed by a network contact user via an instant message application or via a web browser accessing a sharing application or an inquiry application or the like. In one embodiment, the inquiry indication may be displayed adjacent or near the inquiring user's name. In another embodiment where the notice is an email message sent to the network contact, the inquiry indication is a display of the email message.

At block 230, a request to display at least one inquiry feature is received. A network contact using a web application or an instant message application may request at least one inquiry feature to be displayed by selecting the inquiry indication. In one embodiment, the inquiry indication may be selected by clicking on the inquiry indication while the cursor is over the inquiry indication. In another embodiment, the inquiry indication may be selected by "hovering" the cursor over the inquiry indication. In yet another embodiment, block 230 may be eliminated, and the network contact may select the inquiry indication, having an embedded link, and link to the inquiry application to view the inquiry posted by the inquiring user.

At block 240, at least one inquiry feature is displayed. The inquiry feature to be displayed to a network contact may be determined by the network contact user, the inquiry application provider, the sharing application provider, the instant message application provider, the inquiring user, or a combination thereof. Inquiry features to be displayed may be selected manually, by algorithm (e.g., most frequently viewed), or some other manner. Additionally, the layout of inquiry features may be organized by the network contact user, the inquiry application provider, the sharing application provider, the instant message application provider, the inquiring user, or a combination thereof.

At block 250, a request to display the inquiry is received. In one embodiment, the network contact may request the inquiry be displayed by selecting an inquiry feature or inquiry indication, such as text or a picture having an embedded link. The inquiry indication or inquiry feature may be selected by providing input, such as a mouse click, while the cursor is over the inquiry indication. In yet another embodiment, block 250 may be eliminated. For instance, upon selection of the inquiry indication, the inquiry may be displayed in the form of an inquiry feature. The network contact may then respond to the inquiry via a method alternative to the inquiry application, such as instant messaging, blogging, or e-mailing. At block 260, the inquiry is displayed via the inquiry application.

FIGS. 3-7 illustrate exemplary displays of a graphical user interface for an inquiry indication system, according to embodiments of the present invention. The inquiry indication system may include inquiry applications that electronically display a forum for posting inquiries and responding to inquiries—such as, for example, Windows Live™ QnA, Yahoo!® Answers, Askville™ by Amazon®, or the like. User can interact with the inquiry application using well known input components—such as, for example, a mouse, joystick, stylus, touch screen, keyboard, or the like.

Figure 3:
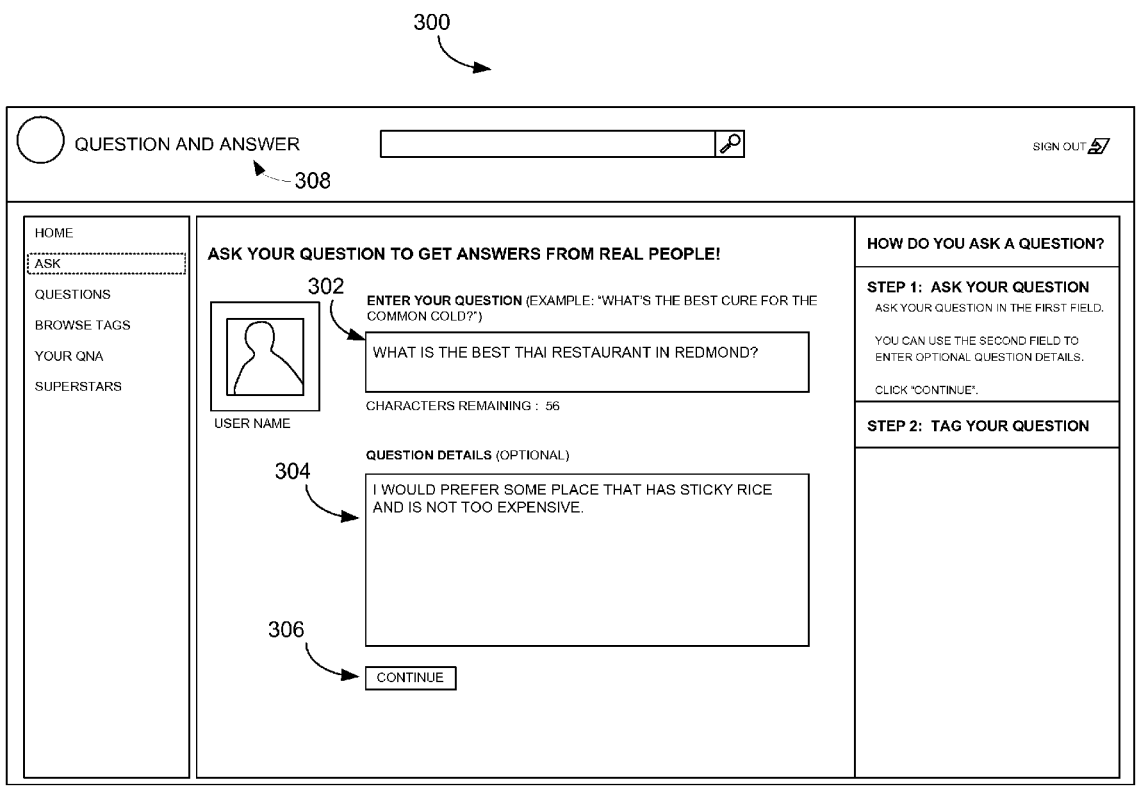
FIG. 3 is an exemplary display of a graphical user interface for preparing and posting inquiries, according to an embodiment.

With reference to FIG. 3, in operation, an inquiry application 308 displays a forum 300 allowing users to prepare and post inquiries on a client-computing device. The inquiring user can prepare an inquiry 302 on the inquiry application 308. Inquiry 302 may be any question, comment, or series of questions or comments that may generate a discussion or generate responses to an inquiry. The prepared inquiry 302 is displayed in user interface 300, as indicated in FIG. 3. The inquiring user may also prepare inquiry details 304 to be posted on the inquiry application 308. In one embodiment, inquiry details 304 may be combined with inquiry 302. In another embodiment, inquiry details 304 are not entered. The inquiry 302 and inquiry details 304 may be entered in to a text box as shown in FIG. 3.

Upon preparing inquiry 302 and inquiry details 304, if desired, the inquiring user may select a "continue" button 306 to continue preparing the inquiry. In one embodiment, a selection to continue preparing the inquiry may be made by a right click or a menu selection. In another embodiment, a selection to continue preparing the inquiry may be eliminated, thereby permitting all inquiry preparation to be performed on one user interface.

Figure 4:
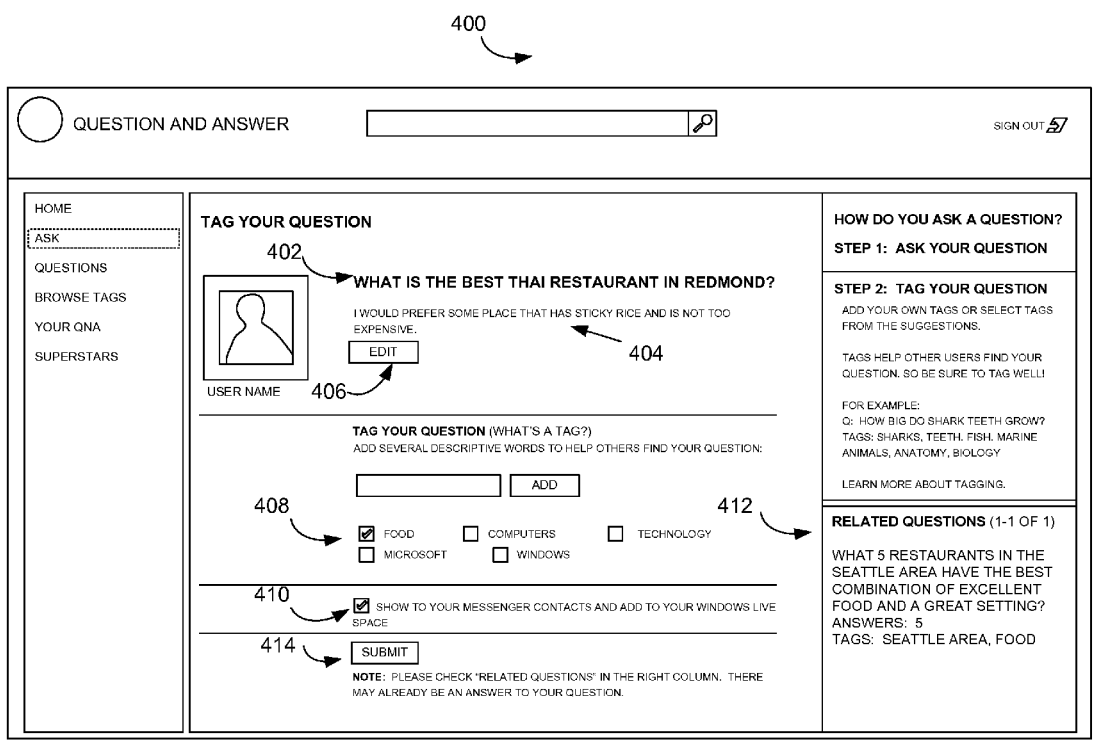
FIG. 4 is an exemplary display of a graphical user interface for preparing and posting inquiries, according to an embodiment.

Upon selecting "continue" button 306, with reference to FIG. 4, a display 400 for entering additional inquiry information is provided. Inquiry 402 and inquiry details 404 are displayed along with a link 406 embedded in text or a picture such that the inquiring user may edit the inquiry or inquiry details. In one embodiment, inquiry 402 and/or inquiry details 404 need not be displayed.

The inquiring user may tag the inquiry 408, as illustrated in FIG. 4. Tagging an inquiry provides a general topic or category for the inquiry so that the inquiry may be categorized and organized by the specified tag. In one embodiment, inquiry tags may determine the network contacts notified of the inquiry. For example, only network contacts having an interest in sports will be notified of a sports related inquiry. In another embodiment, tagging the inquiry may be eliminated.

Further, in the graphical user interface of FIG. 4, the inquiring user may designate 410 that an inquiry indication be received by network contacts. In one embodiment, the inquiring user may select specific network contacts to receive the inquiry indication. In another embodiment, the inquiring user may select a category of network contacts, such as family, friends, co-workers, etc., to receive the inquiry indication. In yet another embodiment, the designation 410 may be eliminated and the inquiry indication may be automatically displayed to either all network contacts, a group of network contacts, or a specific category of network contacts. In the embodiment with only one interface for inquiry preparation, the designation of network contacts to receive an inquiry indication is on the single interface.

In one embodiment, the graphical user interface may display related questions 412 such that the inquiring user may view previous related inquiries and decide whether to submit the inquiry based upon the previous responses. Upon finalizing the inquiry details, the inquiring user may select to "submit" the inquiry 414 to generate responses.

Figure 5:
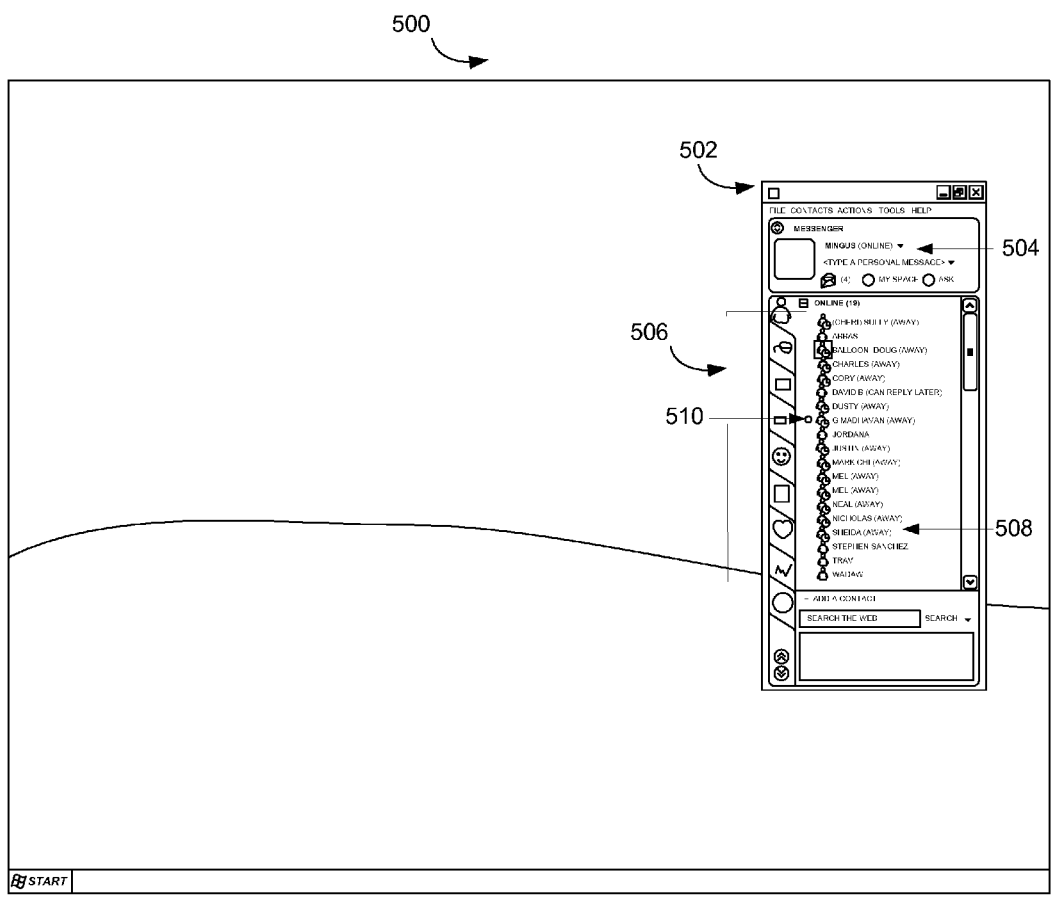
FIG. 5 is an exemplary display of a graphical user interface for inquiry indication, according to an embodiment.

After submitting the inquiry, the designated network contacts are notified of the inquiry. FIG. 5 illustrates one embodiment of a graphical user interface displayed to a designated network contact using an instant message application. Instant message application interface 500 includes window 502, network contact status indicator 504 within window 502, a contact list 506, contact username 508 for each contact, and an inquiry indication 510. Each time a network contact logs on to an instant message application, an server provides contact list 506 to the network contact's instant message application and indicates inquiring users in the contact list 506 that have submitted an inquiry into the inquiry application. In one embodiment, a network contact using an instant message application has numerous contacts listed in contact list 506. In another embodiment, a network contact using an instant message application may have only one contact listed in contact list 506. Inquiry indication 510 serves to notify a network contact that an inquiring user has submitted an inquiry.

The inquiry indication shown in FIG. 5 may alternatively take the form of a change in color surrounding the online indicator for a contact, an indication icon, an inquiring user name format, an inquiry subject, an inquiry title, a link to the user inquiry, a sound, a highlighted contact username, or a combination thereof. In one embodiment, the inquiry indication 510 is located adjacent or near the username 508 so as to visually display the inquiring user and inquiry association. In another embodiment, the inquiry indication may be located anywhere in the contact list of the instant message application so as to provide the network user with a general knowledge that an inquiring user has submitted a recent inquiry.

Figure 6:
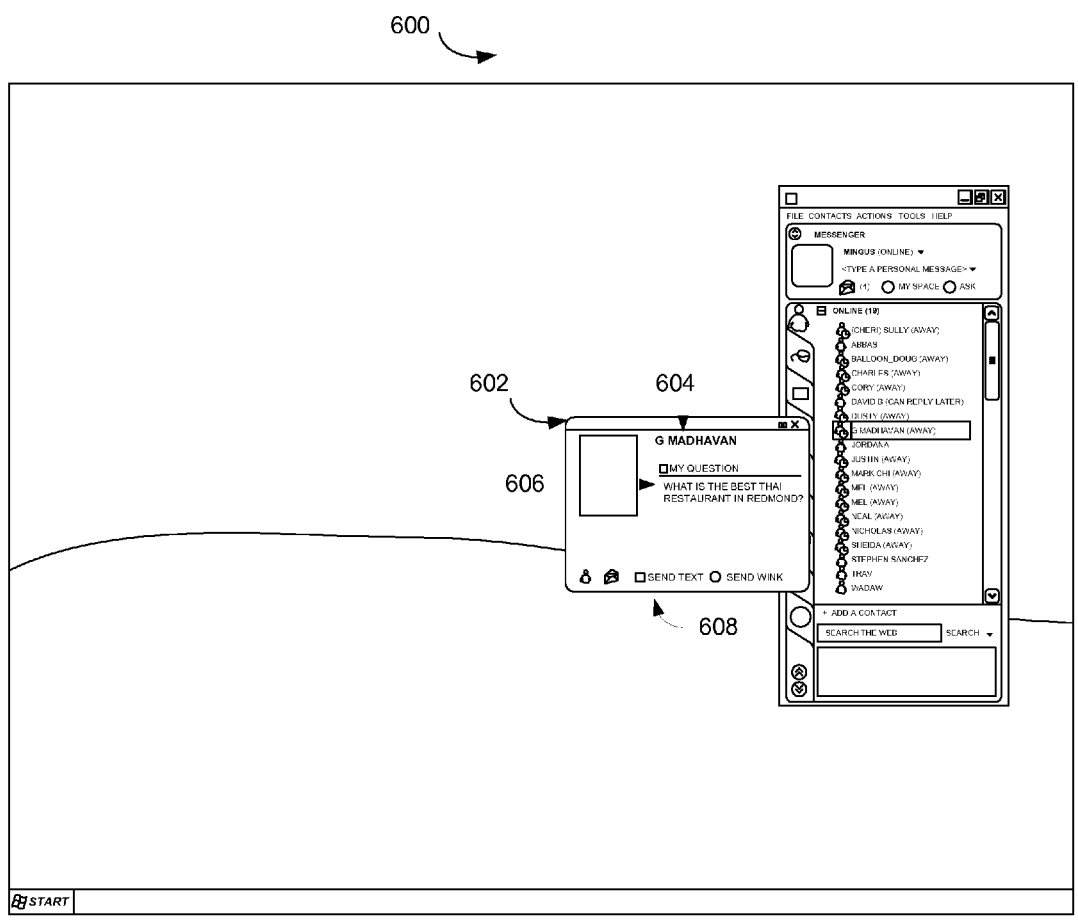
FIG. 6 is an exemplary display of a graphical user interface for inquiry indication, according to an embodiment.

With reference to FIG. 6, user interface 600 is displayed upon selection of an inquiry indication. The client messenger interface 500 of FIG. 5 receives input by the network contact selecting inquiry indication 510. Once selected, the instant message application retrieves and displays the inquiry feature window 602 of FIG. 6. Inquiry feature window 602 includes inquiry features 604, 606, and 608. Inquiry feature 604 provides the network user with the user name of the inquiring user, thereby identifying the user who submitted the inquiry. Inquiry feature 606 displays the inquiring user's inquiry having an embedded link so that the network contact user may link directly to the inquiring user's inquiry and respond to the inquiry. Inquiry feature 608 includes various methods in which the network contact user may contact the inquiring user to respond to the inquiry, ask a question pertaining to the inquiry, etc. Inquiry feature window 602 may display a variety of inquiry features including tags and inquiry details. In one embodiment, the inquiry feature window 602 may not be displayed and selecting the inquiry indication 510 may link the network contact user directly to the inquiry submitted to the inquiry application.

Figure 7:
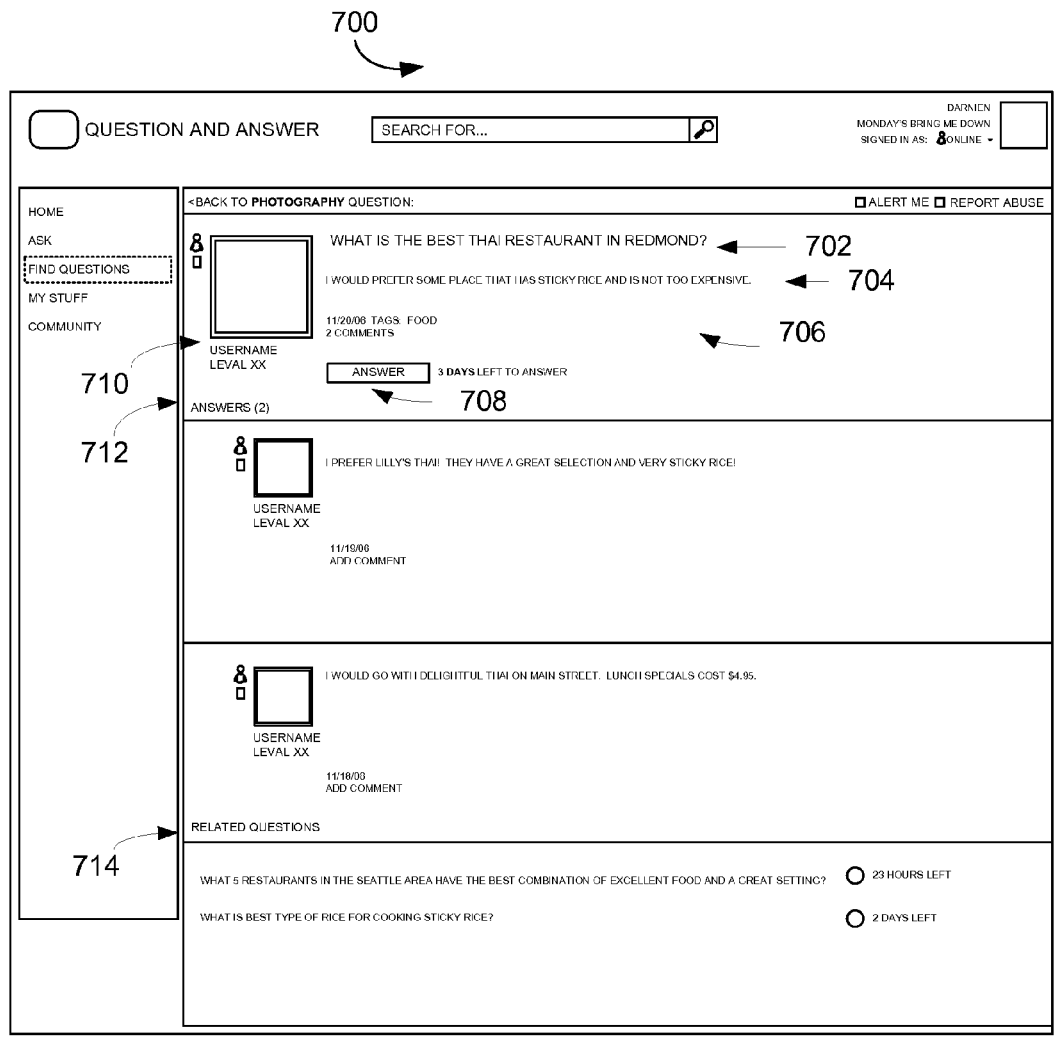
FIG. 7 is an exemplary display of a graphical user interface for displaying a posted inquiry, according to an embodiment.

Finally, FIG. 7 illustrates a graphical user interface 700 displaying the inquiry submitted to the inquiry application, such as inquiry application 140 of FIG. 1. When a network contact selects inquiry feature 606 of FIG. 6 having an embedded link to the inquiry, the network contact user is linked to the inquiry within inquiry application. Alternatively, graphical user interface 700 may also be displayed upon selecting the inquiry indication 510 of FIG. 5. Graphical user interface 700 provides the inquiry 702, inquiry details 704, associated tags 706, a link for answering the inquiry 708, the username of the inquiring user 710, answers 712 previously submitted by other responders, which may be other network contacts or other Internet users, and related questions 714. In one embodiment, only a text box for preparing an answer and a link for submitting an answer may appear. In another embodiment, various attributes, including those mentioned above and additional attributes, may be viewed in graphical user interface 700. Even though network contacts or selected network contacts are notified, the inquiry may be posted on the inquiry application to be answered by all inquiry application users.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method for automatically displaying a graphical indicator at a client computer when a message has been posted to a server-based message board forum, the method comprising:

receiving at a receiving user's computer a notice sent via a network by a server, the notice indicating that an inquiring user has posted an inquiry on a message board forum, where the message board forum allows users to, via the network, submit for posting new messages and responses to posted messages in a public forum and where messages are stored for future viewing and responding-to by users, and where the notice has been received without the receiving user having accessed the message board forum; and displaying at the user's computer a graphical indicator in response to receiving the notice at the user's computer, the graphical indicator being displayed within a contact list to indicate that the inquiring user has posted the inquiry on the message board forum.

2. The method of claim 1, wherein the method further comprises receiving a request from the user to display the inquiry.

3. The method of claim 1, wherein the method further comprises receiving a request from the user to display at least one inquiry feature, wherein the at least one inquiry feature may be an inquiry subject, an inquiry title, a link to the user inquiry, or a combination thereof.

4. The method of claim 1, wherein the graphical indicator may be an indication icon, an inquiring user name format, an inquiry subject, an inquiry title, a link to the user inquiry, or a combination thereof.

5. The method of claim 1, wherein the user is listed in an inquiring user's contact list.

6. The method of claim 5, wherein the contact list may be included in a web application or an instant message application.

7. A method for notifying one or more users of a message submitted to a network message forum, the method comprising:

posting a message to a network message forum, where the message comprises text submitted to the network message forum by a first user, and where the network message forum allows users to, via the network, submit for posting new messages and responses to posted messages in a public forum and where messages are stored for future viewing and responding-to by users; and responsive to the posting of the message by the first user, automatically identifying one or more instant messenger contacts of the first user and automatically transmitting notice of the posted message to the one or more instant messenger contacts of the first user.

8. The method according to claim 7, wherein the notice is configured to be capable of causing display of a graphical indicator by a computer operated by one of the one or more network contacts.

9. The method according to claim 8, wherein the graphical indicator identifies the first user.

10. The method according to claim 9, wherein the first user is graphically identified in a displayed list of network contacts of the user who received the notice.

11. The method according to claim 8, wherein the graphical indicator can be interacted with to view the message posted by the first user.

12. The method according to claim 8, wherein the graphical indicator can be interacted with to view at least one inquiry feature, wherein the at least one inquiry feature may be an inquiry subject, an inquiry title, a link to the user inquiry, or a combination thereof.

13. The method of claim 8, wherein the graphical indicator may be an icon, an inquiring user name format, an inquiry subject, an inquiry title, a link to the user inquiry, or a combination thereof.

14. The method of claim 7, wherein the first user is listed in an inquiring user's contact list, wherein the contact list may be included in a web application or an instant message application.

15. A graphical user interface embodied on a computer-readable medium and executable on a computer, said graphical user interface comprising:
- a first display area on a user's computer configured for displaying an inquiry indication in a contact list, the inquiry indication indicating that an inquiring user has posted an inquiry on a message board forum,
- where the inquiry indication is displayed near an inquiring user identifier, listed within the contact list, that corresponds with the inquiring user that posted the inquiry on the message board forum in response to a notice sent to the user based on information indicating a personal relationship between the inquiring user and the user receiving the notice, and
- where the message board forum allows users to, via the network, submit for posting new messages and responses to posted messages in a public forum and where messages are stored for future viewing and responding-to by user.

16. The graphical user interface of claim 15 further comprising a second display area configured for displaying at least one inquiry feature, wherein the second display area is displayed upon a request for displaying the second display area.

17. The graphical user interface of claim 16, wherein the at least one inquiry feature may be an inquiry subject, an inquiry title, a link to the user inquiry, or a combination thereof.

18. The graphical user interface of claim 16 further comprising a third display area configured for displaying the inquiry, wherein the third display area is displayed upon a request for displaying the second display area.

19. The graphical user interface of claim 15, wherein the at least one inquiry indication may be an icon, an inquiring user name format, an inquiry subject, an inquiry title, a link to the user inquiry, a sound, or a combination thereof.

* * * * *